United States Patent
Bruland et al.

(10) Patent No.: US 7,227,098 B2
(45) Date of Patent: Jun. 5, 2007

(54) METHOD AND SYSTEM FOR DECREASING THE EFFECTIVE PULSE REPETITION FREQUENCY OF A LASER

(75) Inventors: Kelly Bruland, Portland, OR (US); Steve Swaringen, Rockwall, TX (US); Steve Stone, Seattle, WA (US); Keith Grant, Aloha, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 10/931,461

(22) Filed: Aug. 31, 2004

(65) Prior Publication Data

US 2006/0027540 A1 Feb. 9, 2006

Related U.S. Application Data

(60) Provisional application No. 60/599,400, filed on Aug. 6, 2004.

(51) Int. Cl.
*B23K 26/38* (2006.01)

(52) U.S. Cl. .......................... 219/121.69; 219/121.62; 219/121.8

(58) Field of Classification Search .......... 219/121.62, 219/121.61, 121.6, 121.68, 121.69, 121.8, 219/121.81, 121.82; 372/38.01, 38.02, 38.07, 372/10, 26

See application file for complete search history.

(56) References Cited

U.S. PATENT DOCUMENTS

| 5,339,323 | A | 8/1994 | Hunter et al. | |
| 6,172,325 | B1* | 1/2001 | Baird et al. | 219/121.62 |
| 6,300,590 | B1 | 10/2001 | Lauer et al. | |
| 6,339,604 | B1 | 1/2002 | Smart | |
| 6,559,412 | B2 | 5/2003 | Lauer et al. | |
| 6,662,063 | B2 | 12/2003 | Hunter et al. | |
| 6,706,999 | B1* | 3/2004 | Barrett et al. | 219/121.74 |
| 6,947,454 | B2* | 9/2005 | Sun et al. | 372/26 |
| 6,973,104 | B2* | 12/2005 | Smart | 372/26 |
| 2002/0167581 | A1 | 11/2002 | Cordingley et al. | |
| 2003/0081636 | A1* | 5/2003 | Wang | 372/10 |
| 2004/0134894 | A1 | 7/2004 | Gu et al. | |
| 2004/0134896 | A1 | 7/2004 | Gu et al. | |
| 2004/0202207 | A1* | 10/2004 | Wang | 372/10 |
| 2006/0029113 | A1 | 2/2006 | Nilsen et al. | |

FOREIGN PATENT DOCUMENTS

JP  04-098801  3/1992

* cited by examiner

*Primary Examiner*—Geoffrey S. Evans
(74) *Attorney, Agent, or Firm*—Stoel Rives LLP

(57) ABSTRACT

Methods and systems operate a machine having a laser characterized by a PRF (pulse repetition frequency) parameter that specifies a PRF at which pulses produced by the laser have desirable pulse properties for irradiating structures on or within a workpiece. The structures are arranged on the workpiece in a linear pattern having an approximately equal pitch between adjacent structures. The laser emits a laser pulse that propagates along a laser beam propagation path terminating at a laser beam spot on the workpiece. The method is effective to move the laser beam spot across the structures along the linear pattern at a speed greater than the product of the PRF and the pitch to selectively irradiate selected ones of the structures with the laser without substantially degrading the desirable pulse properties.

18 Claims, 6 Drawing Sheets

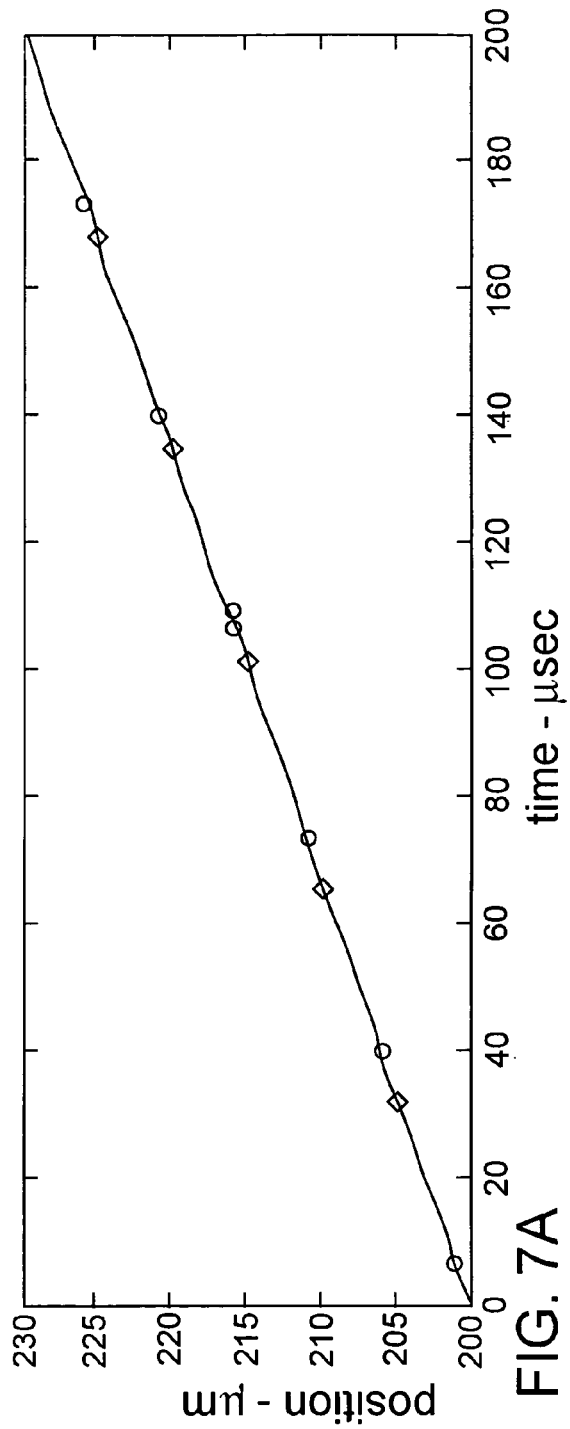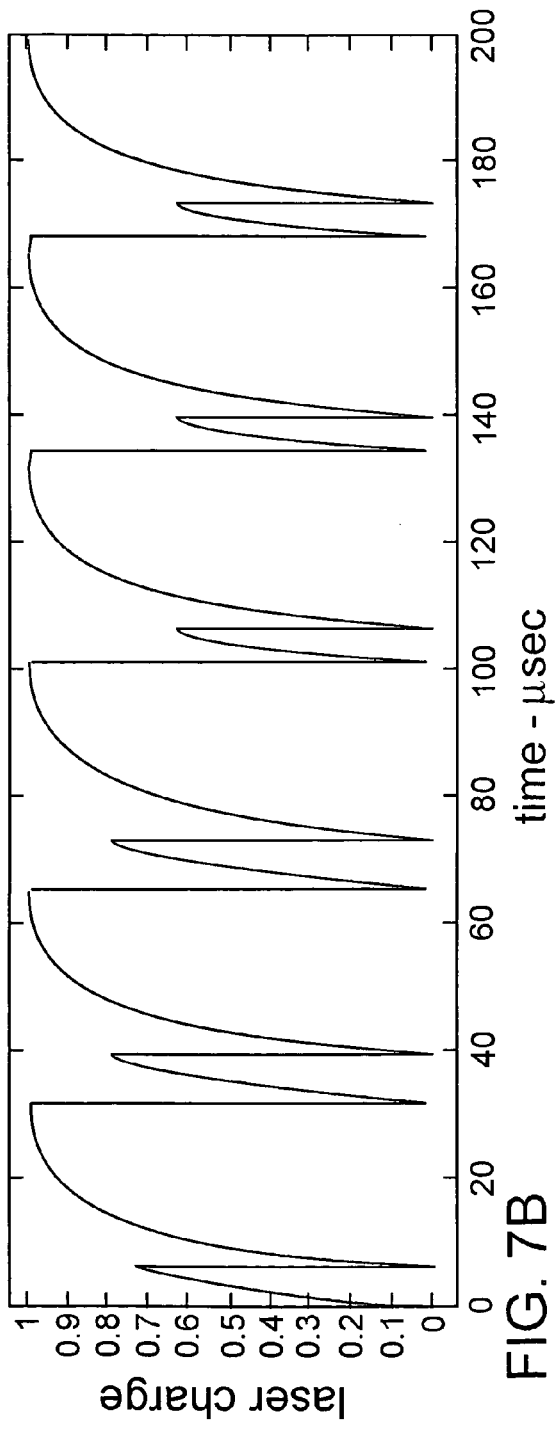

METHOD AND SYSTEM FOR DECREASING THE EFFECTIVE PULSE REPETITION FREQUENCY OF A LASER

RELATED APPLICATION

This application claims priority under 35 U.S.C. § 119 to U.S. Provisional Application No. 60/599,400, entitled "Method and System for Decreasing the Effective Pulse Repetition Frequency of a Laser," filed Aug. 6, 2004, which is incorporated by reference herein in its entirety.

TECHNICAL FIELD

This disclosure relates generally to operation of a pulsed laser and more particularly to the use of laser beam pulses to process a semiconductor integrated circuit during its manufacturing.

BACKGROUND

During their fabrication process, ICs (integrated circuits) often incur defects due to minor imperfections in the process or in the semiconductor substrate. For that reason, IC devices are usually designed to contain redundant circuit elements, such as spare rows and columns of memory cells in semiconductor memory devices, e.g., a DRAM (dynamic random access memory), an SRAM (static random access memory), or an embedded memory. Such devices are also designed to include particular laser-severable links between electrical contacts of the redundant circuit elements. Such links can be removed, for example, to disconnect a defective memory cell and to substitute a replacement redundant cell. Similar techniques are also used to sever links in order to program or configure logic products, such as gate arrays or ASICs (application-specific integrated circuits). After an IC has been fabricated, its circuit elements are tested for defects, and the locations of defects may be recorded in a data file or defect map. Combined with positional information regarding the layout of the IC and the location of its circuit elements, a laser-based link processing system can be employed to remove selected links so as to make the IC useful.

A typical link processing system adjusts the position of the laser beam spot on a semiconductor wafer by moving the wafer in an XY plane underneath a stationary optics table, which supports a laser and other optical hardware. The wafer is moved underneath in the XY plane by placing it on a chuck that is carried by a motion stage. A typical wafer contains a number of dies, each containing an IC. Circuit elements within an IC are typically arranged in a regular geometric arrangement, as are the links between those elements. The links usually lie in regular rows in groups that are termed "link banks," having an approximately uniform center-to-center pitch spacing. To remove selected links in a link bank, a laser beam spot (i.e., the position at which the laser beam's propagation path axis intersects the wafer workpiece) continuously advances along the link bank at an approximately uniform speed while the laser emits pulses to selectively remove links. The laser is triggered to emit a pulse and thereby to sever a link at a selected target position when the laser beam spot is on the target position. As a result, some of the links are not irradiated and left as unprocessed links, while others are irradiated to become severed. The process of progressing along a row of links and severing selected links with a laser pulse is termed a "link run."

Two of the key parameters that impact the time spent processing a link run, and thus throughput, are the maximum velocity limit of the motion stage and the desired link run velocity. Desired link run velocity is the product of the laser pulse repetition frequency ("PRF") and the link pitch. When the desired link run velocity exceeds the maximum velocity limit of the motion stage, a method must be practiced that results in a link run at a velocity that can be accommodated by the stage. Assume, for example, that the links in a link run have a pitch spacing of 4 µm (micrometers), that the motion stage 170 can travel at a maximum speed (while processing) of 200 mm/sec (millimeters per second), and that the laser is designed to have an optimum PRF of 50 kHz (kiloHertz). In that case, the system can operate at both the optimum PRF and the maximum motion stage speed. As another example, assume that the laser instead has an optimum PRF of 60 kHz. In this case, pulsing the laser at that rate on the links sequentially would require that the motion stage move at 240 mm/sec, which is faster than it is capable. A simple solution to this problem is to block every other laser pulse and to slow down the motion stage by a factor of two. The main drawback of that solution is that it significantly decreases throughput (e.g., link run velocity reduced to 120 mm/sec in this case). Thus, operation of a laser with a higher PRF can, ironically, slow down the system.

Altering the PRF directly can be disadvantageous, as lasers are often optimized for a particular PRF value. More specifically, the pulse characteristics can vary considerably with changes in the PRF as the charge time of the laser is altered. That is problematic because typical link processing scenarios require fairly consistent laser pulse characteristics from link to link. In other words, the so-called "processing window" for reliably severing links is a small window that is sensitive to pulse characteristics. Characteristics that may change as the PRF of a laser is changed include pulse characteristics such as temporal shape, rise time, width, height, energy, energy stability, and beam propagation characteristics such as beam waist position, beam waist diameter, and $M^2$ value.

U.S. Pat. No. 6,172,325, assigned to the assignee of the present invention and incorporated in its entirety herein by reference, describes laser pulse-on-position technology with a fixed laser PRF. Pulse-on-position technology is desirable because it provides very accurate placement of link blows; however, that patent does not discuss varying laser PRF.

U.S. Pat. No. 6,339,604, which is also incorporated herein by reference, describes operating a laser with a fixed, predetermined charge time to stabilize pulse properties for the purpose of trimming components on a semiconductor IC. Use of a predetermined time is not possible when using the pulse-on-position approach.

SUMMARY

According to one embodiment, a method operates a laser characterized by a PRF parameter that specifies a PRF at which pulses produced by the laser have desirable pulse properties for irradiating a target on or within a workpiece. The laser emits a laser pulse that propagates along a laser beam propagation path terminating at a laser beam spot on the workpiece. The method is effective to operate the laser at an effective PRF lower than the PRF parameter without substantially degrading the desirable pulse properties. The method receives data indicating the location on the workpiece of the target to be selectively irradiated with the laser pulse. The method determines a firing position of the laser beam spot relative to the workpiece at which the laser should emit a pulse directed at the target and calculates, based on a desired charging time, a charging start position of the laser beam spot relative to the workpiece at which the laser should begin charging so as to charge for the desired charging time before the laser beam spot reaches the firing position. The method moves the workpiece and the laser beam spot relative to one another such that the laser beam spot moves over the charging start position and then to the firing position and senses a position of the laser beam spot relative to the workpiece as the workpiece moves relative to the laser beam spot at a velocity. The method commences charging of the laser when the laser beam spot is at the charging start position, whereby the laser charges for approximately the desired charging time, and the method fires the laser when the laser beam spot reaches the firing position, whereby the laser emits a pulse having desired pulse properties. Alternatively, the commencing step can be based on time rather than position.

According to another embodiment, a method operates a laser having a Q switch. The laser is characterized by a PRF parameter that specifies a PRF at which pulses produced by the laser have desirable pulse properties for irradiating targets on or within a workpiece. The laser emits laser pulses that propagate along a laser beam propagation path having a laser beam axis that intersects the workpiece at a laser beam spot when the spot falls on targets on the workpiece. The laser beam spot moves along a surface of the workpiece from target to target in a series of targets. The method is effective to operate the laser at an effective PRF lower than the PRF parameter without substantially degrading the desirable pulse properties. The method monitors the position of the laser beam spot relative to the workpiece as the laser beam spot moves toward a selected target in the series of targets on the workpiece. The method determines a pre-trigger position at which the laser beam spot will be located at a approximately constant time before the laser beam spot will be located at the selected target position. The method opens the Q switch when the laser beam axis is located at the pre-trigger position, triggering the emission of a pulse, and then closes the Q switch whereby the laser charges for an approximately constant charging time before firing. The method opens the Q switch when the laser beam spot is located at the selected target position, whereby the laser emits a pulse having desired pulse properties to propagate along the laser beam propagation path and to impinge upon the selected target.

According to another embodiment, a method operates a laser characterized by an interpulse time parameter that specifies a time between pulses produced by the laser and having desirable pulse properties for irradiating a target on or within a workpiece. The laser emits a laser pulse that propagates along a laser beam propagation path terminating at a laser beam spot on the workpiece. The method is effective to operate the laser at an effective interpulse time greater than the interpulse parameter without substantially degrading the desirable pulse properties. The method receives data indicating the location on the workpiece of the target to be selectively irradiated with the laser pulse. The method also determines a firing position of the laser beam spot relative to the workpiece at which the laser should emit a pulse directed at the target and calculates, based on the interpulse time, a pre-pulsing position of the laser beam spot relative to the workpiece at which the laser should emit a pulse beginning approximately the interpulse time before the laser beam spot reaches the firing position. The method moves the workpiece and the laser beam spot relative to one another such that the laser beam spot moves over the pre-pulsing position and then to the firing position and senses a position of the laser beam spot relative to the workpiece as the workpiece moves relative to the laser beam spot. The method fires the laser when the laser beam spot is at the pre-pulsing position, whereby the laser emits a pre-pulse, and prevents the pre-pulse from reaching the workpiece. The method fires the laser when the laser beam spot reaches the firing position, whereby the laser emits a pulse having desired pulse properties.

According to yet another embodiment, a system irradiates a selected target in a series of targets on or within a workpiece. The system comprises a laser, a laser beam propagation path, a motion stage, a position sensor, and a controller. The laser has a Q switch and is characterized by a PRF parameter that specifies a PRF at which pulses produced by the laser have desirable pulse properties. The laser beam propagation path extends from the laser to the workpiece. The path has an axis that intersects the workpiece at a laser beam spot. The motion stage moves the workpiece and the laser beam spot relative to one another. The position sensor indicates the relative position of the laser beam axis with respect to the workpiece. The controller is connected to the Q switch and the position sensor. The controller operates the laser at an effective PRF lower than the PRF parameter without substantially degrading the desirable pulse properties. The controller implements one of the preceding methods.

Details concerning the construction and operation of particular embodiments are set forth in the following sections with reference to the below-listed drawings.

BRIEF DESCRIPTION OF THE DRAWINGS

FIG. 7 is a set of plots of laser beam spot position and laser charge as functions of time according to one embodiment.

DETAILED DESCRIPTION OF EMBODIMENTS

With reference to the above-listed drawings, this section describes particular embodiments and their detailed construction and operation. As one skilled in the art will appreciate, certain embodiments may be capable of achieving certain advantages over the known prior art, including some or all of the following: (1) more precise matching of a laser's effective PRF to the requirements of the motion stage during link processing operations without adversely affecting laser pulse properties; (2) higher throughput for link processing in some situations; (3) greater flexibility to use a laser over a range of effective PRFs; (4) more consistent laser pulse properties in cases where the PRF is inherently time-varying; and (5) improved system accuracy attained through position feedback for pulse triggering. These and other advantages of various embodiments will be apparent upon reading the following.

Figure 1:
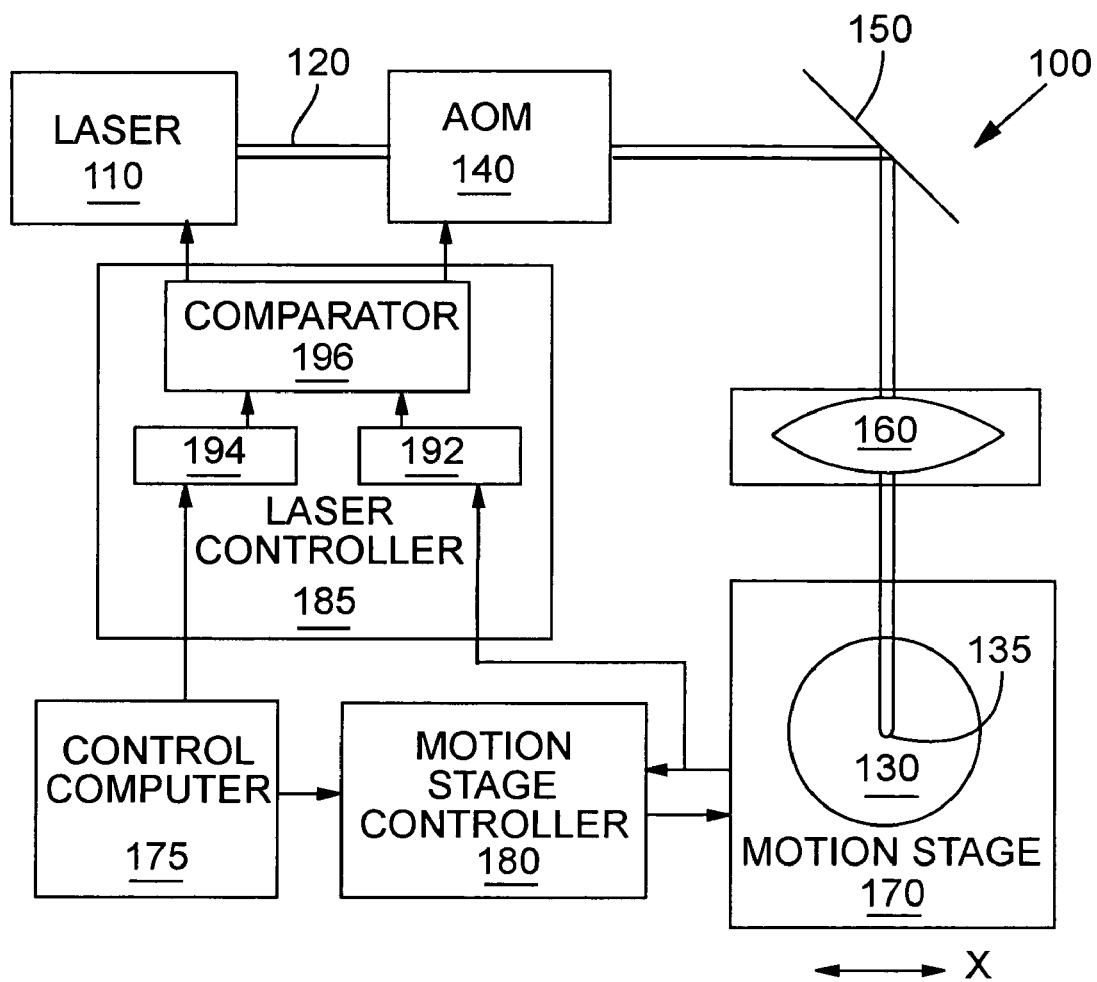
FIG. 1 is a block diagram of a link processing system according to one embodiment.

FIG. 1 is a block diagram a link processing system 100 according to one embodiment. The system 100 comprises a pulsed laser 110, which produces a laser beam 120. The nominal PRF of the laser 110 is the approximately constant desired PRF, which may be selected for a number of reasons including production of desirable pulse characteristics and compatibility with temporal requirements of the link processing system 100. The laser beam 120 propagates along a propagation path until it reaches a workpiece 130 at a laser beam spot 135. Disposed along the propagation path are a number of optics elements, including an acoustic-optical modulator (AOM) 140, a mirror 150, and a focusing lens 160. The AOM 140 is responsive to a radio frequency (RF) input, which changes the direction in which the laser beam 120 exits the AOM 140. By selectively driving the AOM 140 with an RF signal having an appropriate amplitude, the AOM 140 can be configured to selectively block or pass the laser beam 120 to the mirror 150, through the lens 160, and onto the workpiece 130. In other words, the AOM 140 behaves like a light switch or shutter in the laser beam propagation path. Any device capable of functioning as a light switch or shutter (e.g., an electro-optic modulator (EOM) or a liquid crystal modulator) can be used in place of the AOM 140.

The workpiece 130 is mounted to a motion stage 170 that moves the workpiece in an XY plane (the laser beam 120 being incident upon the workpiece in the Z direction). The firing of the laser 110, the shuttering of the AOM 140, and the movement of the motion stage 170 are controlled by a control computer 175, a motion stage controller 180, and a laser controller 185. Together they control laser pulsing and AOM shuttering with the laser beam spot 135 relative to the workpiece 130 by monitoring the motion stage position, which is commanded by a the motion stage controller 180, and using this position information to coordinate the laser pulsing and AOM shuttering. Triggering laser emissions based upon position ensures accurate delivery of laser pulses to target link structures. Timing-based laser trigger methods may have diminished accuracy due to errors in the XY stage velocity, causing the motion stage 170 to be in an incorrect position when the laser 110 emits a pulse.

The control computer 175 accesses a target map (not shown), which contains data indicating target positions on the workpiece 130 that should be irradiated (e.g., to sever a link at that position). The target map is typically generated, for example, from a testing process that determines which circuit elements in an IC workpiece are defective. The control computer 175 generates link run commands, sending movement commands to the motion stage controller 180 and sending laser trigger position commands to the laser controller 185. The functions of the control computer 175 may be distributed over one or more physical computers.

In addition to affecting movement of the motion stage 170 via control commands, the motion stage controller 180 includes a position sensor that senses where the laser beam spot 135 is relative to the workpiece 130. That position data can be used in a feedback control loop to accurately control the position of the laser beam spot 135 on the workpiece 130. That measured laser beam spot position data is also forwarded to the laser controller 185, where the position data is used to control the firing of the laser 110. The phrase "laser beam spot" is actually a shorthand expression for the location at which the axis of the laser beam's propagation path intersects the workpiece 130, and the surrounding area of a size and extent approximately equal to what would be illuminated by the laser beam, whether the laser beam is on or off. That spot moves along the top surface of the workpiece 130 as the motion stage 170 moves. Even though the laser beam impinges on that surface at times (when pulsed and not blocked along its propagation path) and not at other times (when not pulsed or pulsed but blocked), the axis of its propagation path is always present.

The laser controller 185 comprises two position registers 192 and 194 as well as a comparator 196. The position register 192 stores the current position of the laser beam spot 135 relative to the workpiece 130, while the position register 194 stores the position of a target or another position of interest (e.g., a pre-charging or pre-pulsing position) as reported by the control computer 175. The comparator 196 compares the contents of both position registers 192 and 194 to determine when they match. When the comparator 196 indicates a match, the laser controller 185 generates commands to the laser 110 and/or the AOM 140, triggering the laser to emit a pulse and/or causing the AOM 140 to be set to a blocking or passing state.

Note that it is immaterial whether the laser-optics is stationary and the workpiece moves (as assumed above for ease of comprehension), or vice versa, or some combination of movement by both bodies occurs. All that is required is the laser beam spot 135 and the workpiece 130 move relative to one another. The purpose of the laser irradiation may be a purpose other than link severing. Laser micromachining, machining, drilling, via drilling, trimming, component trimming, marking, scribing, annealing, changing states of matter, measuring, and reconnecting fuses are a few of the many alternative purposes of the laser irradiation. Nonetheless, link severing is the preferred application. Note finally that the functions of the control computer 175, motion stage controller 180, and laser controller 185 may be performed in fewer physical devices, even a single computer or controller.

Figure 2:
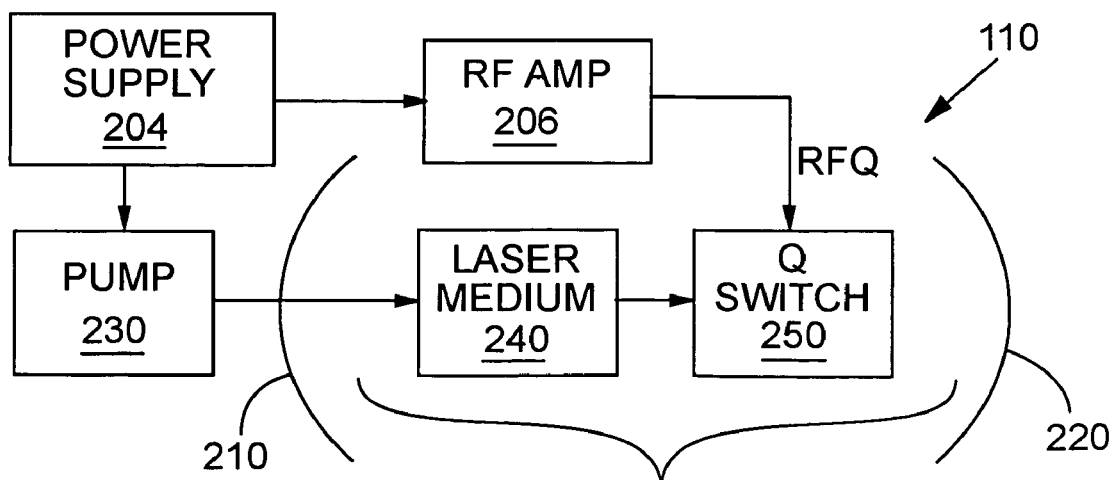
FIG. 2 is a diagram of the laser in the system shown in FIG. 1.

FIG. 2 is a diagram of an embodiment of the laser 110 in simplified form. The laser 110 comprises a laser power supply 204 and RF amplifier 206. The laser 110 also comprises two reflectors 210 and 220, which together define a laser cavity 225, which may be a resonator. The laser 110 also comprises a pump 230, a laser medium 240, and a Q switch 250. Optionally, the laser resonator 225 may also contain an intracavity second harmonic crystal (not shown) and possibly a third harmonic crystal (not shown). The pump 230 pumps energy into the laser medium 240. The pump source 230 preferably provides continuous wave (CW) pumping of the laser medium 240. The laser medium 240 can be, for example, Nd:YLF, Nd:YAG, or Nd:YVO$_4$. Other embodiments of the laser medium 240 may be employed. The pump 230 is preferably a semiconductor laser. Alternatively, the pump 230 may be a flashlamp or arc lamp or other excitation source suitable for pumping the laser medium 240. The pump 230 may further include lenses for efficiently coupling the pump 230 into the laser medium 240. The action of the pump 230 produces excited ions suitable for generation of laser output through the process of stimulated emission. The pump 230 may be physically located at the end of the laser cavity 225 (as shown) or to its side. When the Q switch 250 is closed, energy is stored in the laser cavity 225 as a result of the pumping action. When the Q switch 250 is opened, the stored energy propagates out of the laser cavity 225 as a laser pulse. The opening and closing of the Q switch 250 is controlled by an RF signal RFQ from the RF amp 206. As those skilled in the art will recognize, FIG. 2 is not meant to illustrate the physical arrangement of the laser 110 accurately.

The laser 110 typically operates in pulsed mode, in which the Q switch 250 is alternately closed then opened. During the time when the Q switch 250 is closed, energy is stored in the cavity 225, and that energy is released as a laser pulse when the Q switch 250 is opened. When the laser 110 is repetitively Q-switched, the frequency at which the Q switch 250 is opened is the PRF. As the PRF changes, the properties of the laser pulse (e.g., pulse shape, pulse rise time, pulse width, pulse height, pulse energy, pulse energy stability, etc.) can change significantly. For that reason and because link processing systems are typically highly sensitive to variations in laser pulse properties, lasers in link processing systems typically operate at an approximately fixed nominal PRF at which the laser 110 generates pulses having suitable properties for link blowing. The selection of the nominal PRF may also take into account link processing system parameters, such as the maximum rate at which control computer 175 can process link coordinate information.

Figure 3:
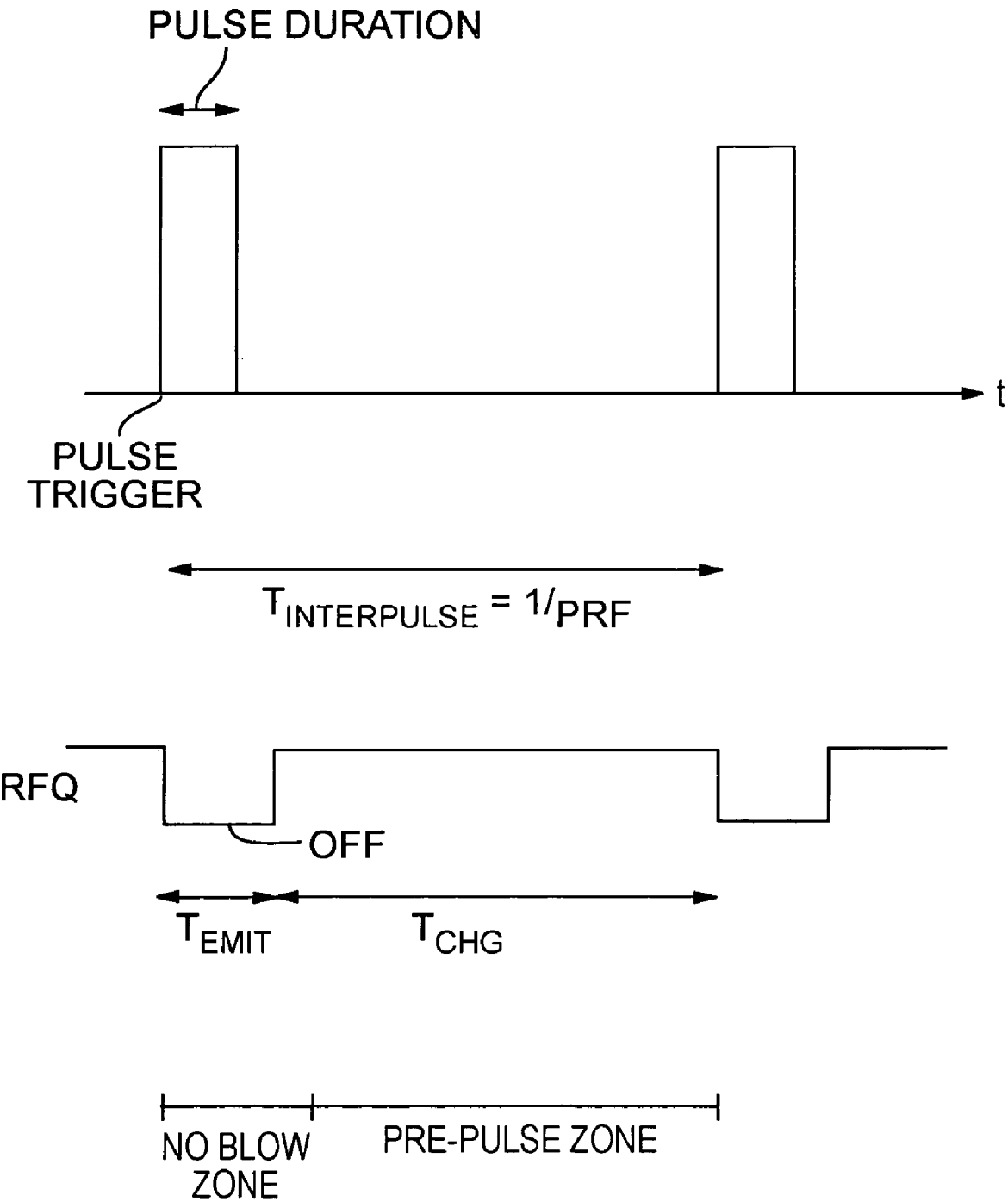
FIG. 3 is a chart showing a laser pulse cycle, interpulse time, charge time, no-blow zone, and acceptable pre-pulse zone, according to one embodiment.

FIG. 3 is a chart showing different zones of a laser pulse period. The start and end of the chart show the generation of two pulses at the nominal laser PRF or period $1/PRF = T_{INTERPULSE}$. FIG. 3 is not drawn to scale. FIG. 3 depicts the pulse duration, and pulse trigger time, which is when a pulse begins. FIG. 3 also depicts the binary states of the signal RFQ in simplified form. The standard laser charging time is $T_{CHG} \approx T_{INTERPULSE} - T_{EMIT}$, where $T_{EMIT}$ is the RF off time pre-programmed in the laser power supply 204. FIG. 3 also depicts two zones. A "pre-pulse" zone is shown in which the laser may be pulsed early by opening the Q switch 250. This results in a depletion of the energy stored in the laser cavity 225. Pulses emitted when triggered early will not have the same pulse properties as a pulse triggered with charging time $T_{CHG}$. A "no-blow" zone is also depicted. The no-blow zone consists of the duration of the current pulse, plus some additional time for system components to change state. System components may include the laser controller 185, the RF amp 204, an AOM switch driver, and the AOM 140. In this time zone, in a preferred embodiment, it is not possible to trigger laser pulses due to the finite RF off time $T_{EMIT}$, during which the Q-switch 250 remains commanded open. A typical value of $T_{EMIT}$ is in the range 1–5 μs and can be selected to prevent unwanted parasitic laser pulses from being emitted. Other appropriate values may be selected.

In another embodiment, the step of pre-pulsing the laser 110 can be omitted, and the laser charge time $T_{CHG}$ can be held approximately constant before each pulse. This method can be practiced by keeping the Q switch 250 open following a pulse until the laser beam spot 135 reaches the pre-pulse position or until the pre-pulse time. Then the Q switch 250 is closed, allowing the laser 110 to charge until triggered to emit a pulse or dummy pulse. In essence, the pre-pulse position and/or time is replaced by a laser charge position and/or time. Because this method ensures an approximately constant laser charge time $T_{CHG}$, pulse properties are not degraded and the laser 110 is operated at an effective PRF lower than the nominal PRF.

FIG. 4 is a set of diagrams depicting position-based triggering of laser emissions according to a number of different techniques applied to link banks 410, 420, 430, and 440, respectively. FIG. 4A is a diagram depicting position-based triggering of laser emissions when the link run velocity, equal to link pitch times nominal laser PRF, is less than or equal to the maximum stage velocity. Link bank 410 comprises a number of regularly spaced links, the illustrated ones in the segment being labeled 450A–459A. In this mode of operation, the laser beam spot 135 moves along the link bank 410 left to right as shown. The laser beam spot 135 is shown over the link 459A. Before reaching that position, the laser beam spot 135 moved across the links 450A–458A in that order. When the position of the laser beam spot 135 coincided with the positions of each of the links 450A–458A, the Q switch 250 opened to emit a pulse from the laser 110. The AOM 140 was in a blocking state when the laser beam spot 135 was over the links 452A, 456A, and 458A so that they were not severed, while the AOM 140 was in a passing state when the laser beam spot 135 was on the links 450A and 454A so that they were severed by the laser pulse. Because the links 452A, 456A, and 458A were not severed, they are termed "dummy" targets and the pulses that were directed toward them but blocked are termed dummy pulses. Likewise, the laser beam spot 135 will sever the link 459A if the AOM is not in a blocking state when the laser beam spot 135 is on that link.

Figure 4A:
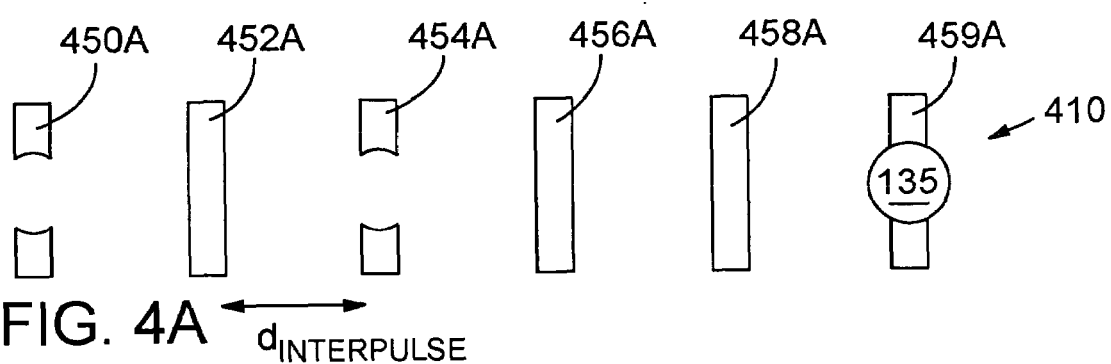
FIG. 4 is a chart showing techniques for selecting laser pre-triggering and link run velocity for the performance of link runs, according to certain embodiments.

In FIG. 4A, the time for the laser spot 135 to traverse between target links and dummy links on the wafer is approximately equal to the reciprocal of the nominal PRF; thus the laser interpulse period $T_{INTERPULSE}$ and charging time $T_{CHG}$ are approximately constant. Minor perturbations in the trigger time can occur because the velocity of the motion stage 170 typically cannot be exactly controlled, and the stage position sensor typically contains some sensor noise. When the stage velocity is slightly higher than the desired link run velocity, laser emission is triggered early and the interpulse period and charging time are slightly less than is desired. Likewise, when the stage velocity is slightly lower than the desired link run velocity, laser emission is triggered late and the interpulse period and charging time are greater than is desired.

These minor perturbations in charging and trigger times cause minor perturbations in laser pulse properties. However, these minor perturbations in a position-based laser trigger are a tradeoff for having laser pulses accurately impinge upon the desired locations of target link structures. If laser emission was triggered based upon fixed time, stage velocity error would lead to improper pulse positioning, with pulses arriving offset from the center of the desired target links along the axis of the link run.

In FIG. 4A the spatial distance between adjacent links (e.g., links 452A and 454A) is denoted $d_{INTERPULSE}$. In other words, the link pitch is $d_{INTERPULSE}$, which is the laser interpulse period $T_{INTERPULSE}$ converted to distance units. For a constant velocity v of the motion stage 170, $d_{INTERPULSE}$ and $T_{INTERPULSE}$ are related by the equation $T_{INTERPULSE} = d_{INTERPULSE}/v$ or the equivalent equation $v = d_{INTERPULSE} \cdot PRF$. Because FIG. 4A assumes that v can be chosen to satisfy that equation, the laser 110 can operate at its nominal PRF and therefore generate pulses having desirable properties for effective link blowing, as the laser cavity charges for approximately its natural charging time $t_{CHG}$ between pulses.

Figure 4B:
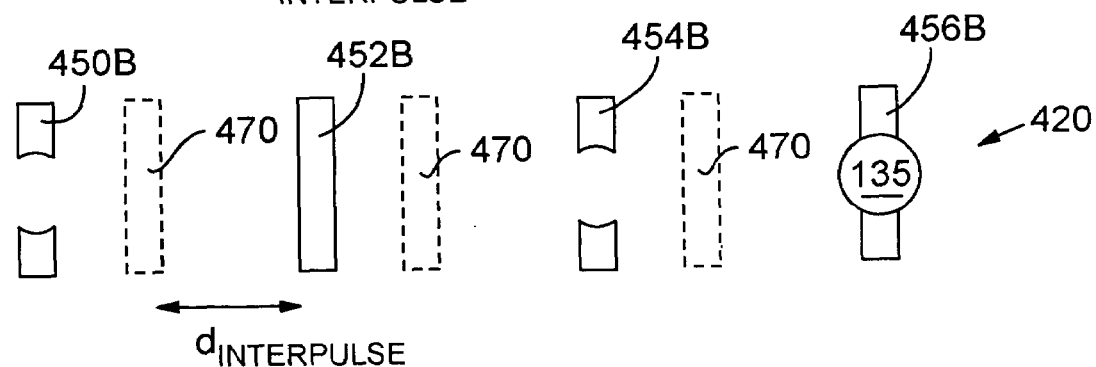

In FIG. 4B, a second mode of operation is depicted that shows the insertion of pre-pulses. Pre-pulses are added because in this case, the desired link run velocity v=d*PRF exceeds the maximum permissible link run velocity. It is not possible to traverse pitch distance in the inherent time of a laser pulse period. In this case, it is undesirable to diminish throughput by dramatically reducing link run velocity and delivering every nth pulse to target link structures. It is also undesirable to operate the laser at a PRF that is lower than the nominal PRF, since laser pulse properties will be impacted. The laser cavity 225 would store more energy than a desirable pulse should have, and pulse properties such as shape and stability may be degraded.

The mode of operation depicted in FIG. 4B results in link runs at the maximum stage velocity, and very nearly uniform pulse properties. This mode of operation involves the insertion of pre-pulses, which are triggered based upon timing or position comparison. Pre-pulses are generated to release energy from the laser cavity 225 such that pulses (labeled 530 and 535 on FIG. 5) are substantially equal. By use of pre-pulses, the laser 110 will have an approximately constant interpulse period or distance $d_{INTERPULSE}$, as shown between a pre-pulse position 470 and the position of a link 452B. An approximate charging time results because the true laser trigger to emit a transmitted pulse to a link or to emit a blocked pulse toward a dummy link is generated by position comparison. The resultant behavior, is that link runs are performed at the maximum stage velocity, which is good for throughput, and the laser interpulse period $T_{INTERPULSE}$ or the charge time $T_{CHG}$ or both are approximately constant, which is good for pulse properties. Thus, this method reduces the effective laser PRF without an undesirable degradation of pulse properties.

Figure 4C:
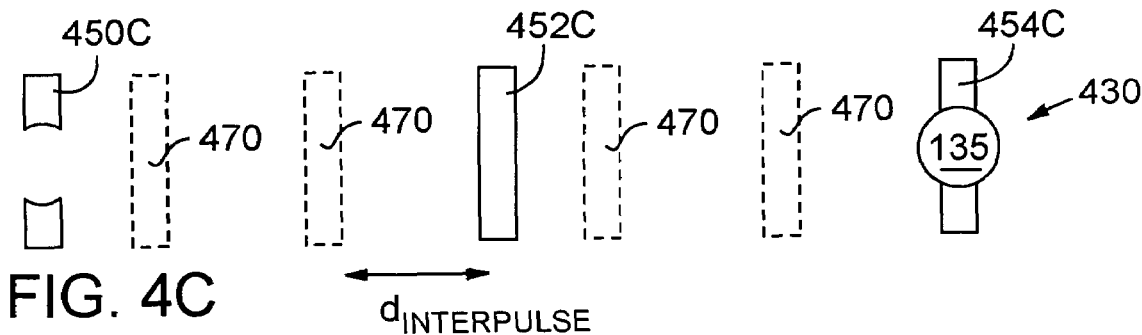

FIG. 4C depicts a third mode of operation, in which the desired link run velocity is multiple times more than the maximum stage velocity. In this mode, multiple pre-pulses are generated between each actual or dummy pulse. By releasing the built-up energy in the laser cavity 225 repeatedly in this way, the workpiece 130 can be more effectively shielded from unwanted laser radiation than if the laser were allowed to charge without release up to the point of the final pre-pulse, which might then have sufficient energy to leak through the AOM 140 and reach the workpiece 130.

Figure 4D:
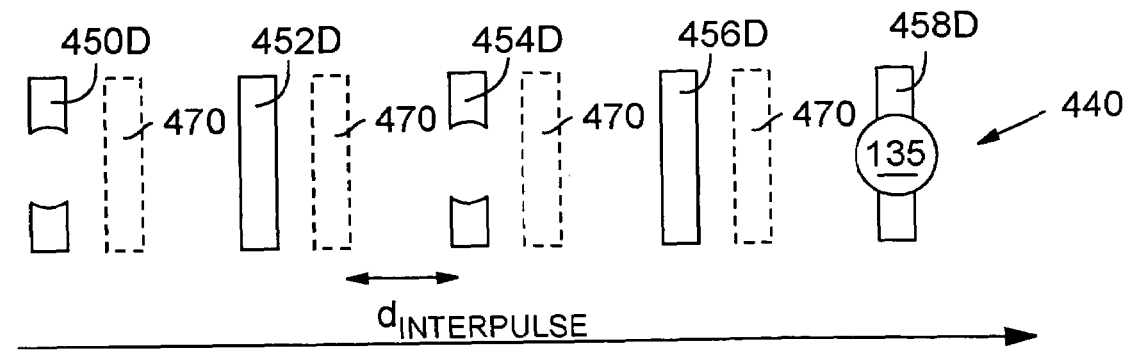

FIG. 4D depicts a fourth mode of operation, in which the desired link run velocity is only slightly more than the maximum stage velocity. In this case, the insertion of pre-pulses and completion of the link run at the maximum velocity is not possible because the pre-pulses would be inserted in the no-blow region depicted in FIG. 3. Instead, in this mode the link run velocity is decreased below the maximum link run velocity such that it is possible to use pre-pulses. The minor decrease in throughput that results is necessary in order to achieve the desired laser pulse properties through the use of pre-pulses. However, this throughput decrease is minor in comparison with using every other pulse and dividing link run velocity in half. Thus, higher throughput and consistent pulse properties result.

In all cases illustrated in FIG. 4, triggered laser pre-pulses and dummy pulses are blocked from reaching the workpiece 130 by the AOM 140. Desired pulses are allowed to pass through the AOM 140 and reach target link structures.

Note also that the position or timing of pre-pulses and regular (blocked or delivered) pulses may also be calculated taking into account the time delays attributable to hardware in the system 100, e.g., in the laser 110, AOM 140, and laser controller 185. Furthermore, it is possible to generate the pre-pulse and pulse signals to take into account the velocity error that exists before generation of the pre-pulse. This method involves using the measured or estimated stage velocity from the motion stage controller 180. While this results in a more accurate estimate of what the true laser charging time will be, the actual laser charging time will still vary due to changes in the stage velocity error, and noise in the stage position sensor.

Note that although the pitch spacings illustrated in FIG. 4 are uniform in each link bank, that need not be the case. The techniques described can be applied naturally to links of non-uniform spacing. In that case, the distance from the previous event-trigger to a current pre-pulse position may vary while the distance from the current pre-pulse to its following laser triggering can be set constant by placing the pre-pulse position appropriately.

Figure 5:
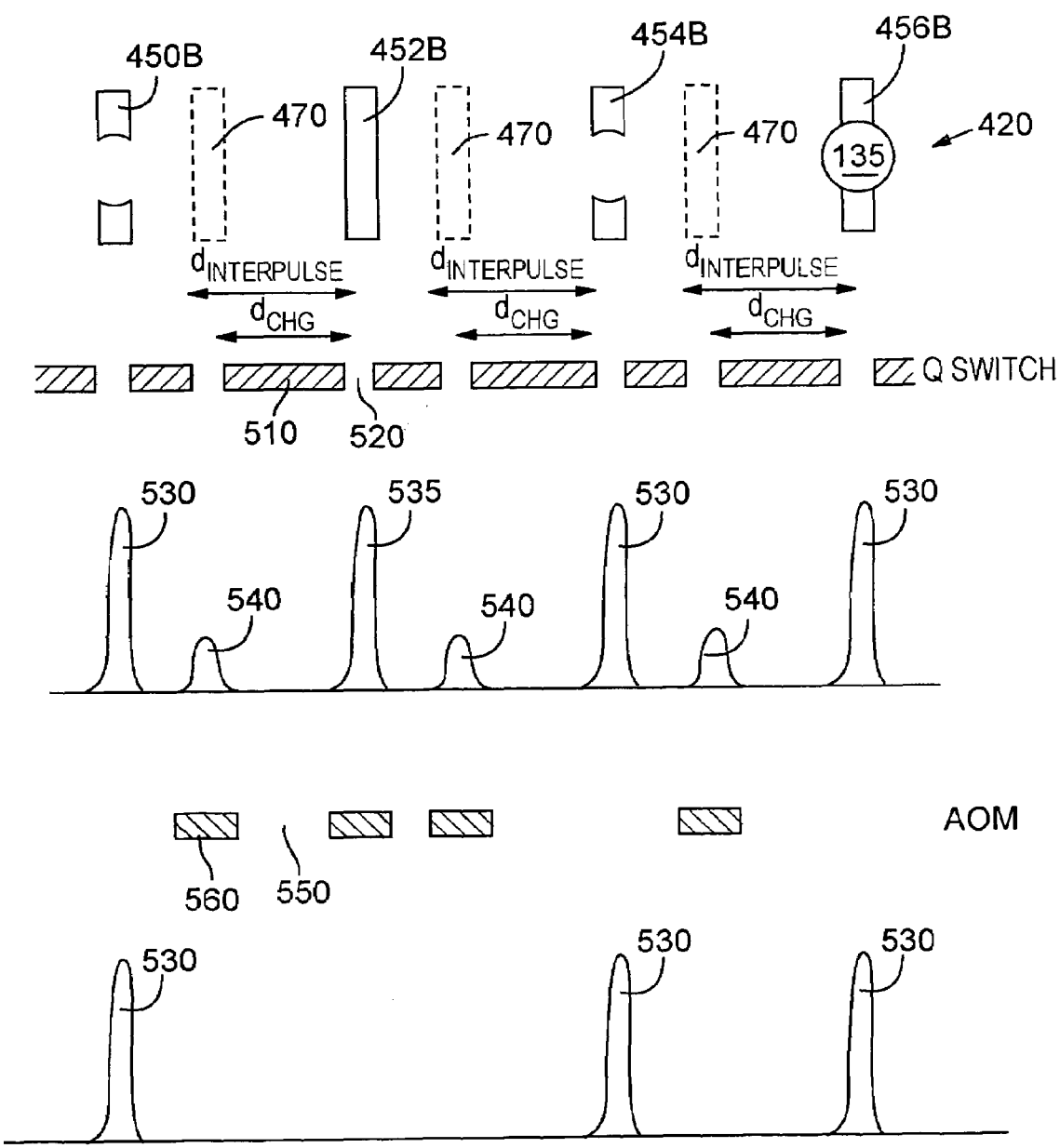
FIG. 5 is a chart showing the states of the Q switch and the AOM of FIGS. 2 and 1, respectively, during processing of a bank of links according to a technique of FIG. 4.

FIG. 5 is a chart showing the states of the Q switch 250 and the AOM 140 during processing of the link bank 420 depicted in FIG. 4B. The Q switch 250 alternates between a closed state 510 and an open state 520. The Q switch 250 is set in the open state 520 where an actual pulse 530 or a dummy pulse 535 is desired as well as where or when a pre-pulse 540 is generated. As can be seen, the distance from each pre-pulse 540 to the next actual or dummy pulse 530 or 535 is the same as $d_{INTERPULSE}$, which results in an interpulse period of approximately $T_{INTERPULSE}$. Consequently, the charging distance $d_{CHG}$ before each dummy pulse 530 or actual pulse 535 is approximately constant. The AOM 140 alternates between a passing state 550 and a blocking state 560. The AOM 140 is set in the blocking state 560 during each pre-pulse 540 and during each dummy pulse 535. However, the AOM 140 is set in the passing state at each actual pulse 530. Similar charts for the other operation modes of FIG. 4 can easily be generated using the teachings set forth herein and are therefore omitted.

The foregoing makes clear that the schemes illustrated in FIG. 4 operate the laser at a lower effective PRF while preserving desirable pulse properties of the nominal PRF by holding the period of time from the pre-pulse to the actual or dummy pulses approximately constant, consistent with the precise position accuracy of a pulse-on-position system. By adjusting the time that the laser 110 is pre-pulsed, the effective PRF can be set to precisely match the speed limit of the motion stage 170 and thus maximize throughput.

A numerical example illustrates this advantage. Assume that link pitch is 4 μm and that the maximum speed achievable by the motion stage 170 is 200 mm/sec. Assume further that the nominal PRF in FIG. 3 is 50 kHz. Thus, in these circumstances, the scheme in FIG. 3 would be optimum in the sense that operation of the laser 110 at its nominal PRF exactly matches the maximum speed achievable by the motion stage 170. However, assume that the laser has a nominal PRF equal to 60 kHz instead (PRF'=60 kHz). That means that the optimum interpulse period $T_{INTERPULSE}$ approximately equals 16.67 μsec. However, it takes 20 μsec for the laser beam spot 135 to traverse the pitch distance d when the motion stage moves at maximum speed. The schemes illustrated in FIG. 4B can solve this mismatch by moving the laser beam spot 135 at its maximum speed (200 mm/sec) while pre-pulsing the laser 110 at a time or corresponding position approximately 3.33 μsec after the previous pulse. This time is approximately 16.67 μsec before reaching each link and triggering the laser 110 to emit a pulse. Approximate times result due to position-based laser pulse generation as the laser beam spot 135 reaches each link and moves toward the next link.

Figure 6:
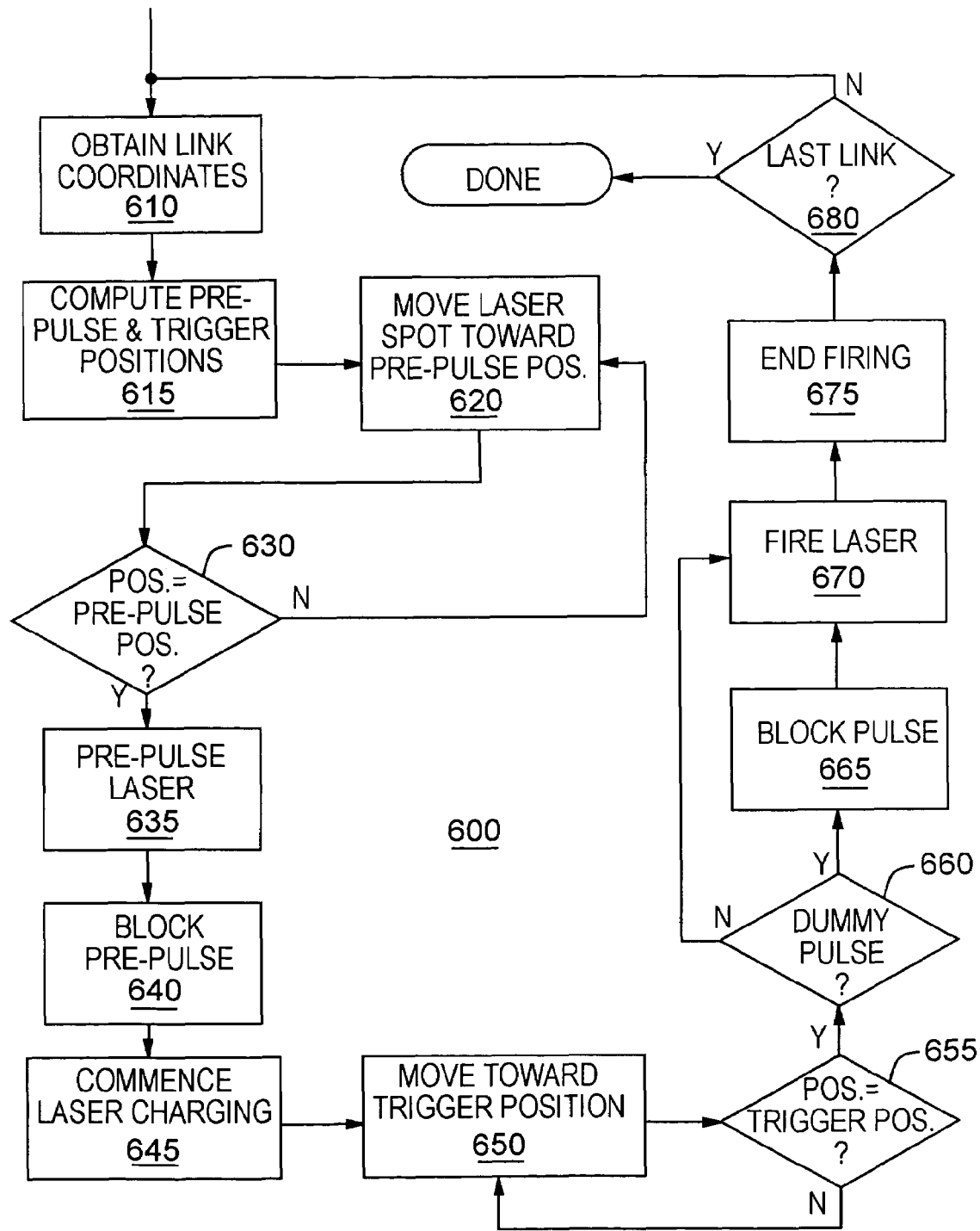
FIG. 6 is flowchart of a method according to one embodiment.

FIG. 6 is flowchart of a method 600 according to one embodiment. The method begins by obtaining (610) link coordinates, which contains position data for targets and dummy links on the workpiece 130. The source of that data may be, for example, a defect map of the workpiece 130. The link coordinates are preferably sorted in a sensible order, such as by link runs (i.e., row by row) in order along each link run. If necessary, the method 600 can sort the target data into a desired order before iterating on each target datum in the subsequent steps.

Starting with the first link, the method 600 computes (615) a trigger or firing position and, if necessary, a pre-pulse position. The method 600 moves (620) the laser beam spot 135 relative to the workpiece 130 toward the pre-pulse position. The method 600 tests (630) whether the sensed position of the laser beam spot 135 matches the computed pre-pulse position and continues performing the moving step 620 as necessary until they match. When that occurs, the method 600 pre-pulses (635) the laser 110 by, e.g., opening the Q switch 250 briefly to release any energy built up in the laser cavity 225 while blocking (640) the pre-pulse by, e.g., setting the AOM 140 in a blocking state. Steps 630–640 may be repeated if multiple pre-pulses are required between adjacent links. After the pre-pulse, the method 600 commences (645) charging the laser 110 by, e.g., closing the Q switch 250 to terminate the pre-pulse. Meanwhile the method 600 moves (650) the laser beam spot 135 toward the trigger/link position. In an ideal system, the trigger position is the link position, but owing to hardware delays, the trigger position may be offset from the link position slightly. The method 600 tests (655) whether the sensed position of the laser beam spot 135 matches the trigger position and continues to perform the moving step 650 until they match. Then, the method 600 tests (660) whether the link is a dummy link. If so, the method 600 prepares to block (665) the pulse before it reaches the dummy link, e.g., by setting the AOM 140 in a blocking state. If the link is an actual target to be irradiated, then the method 600 skips the blocking step 665, fires (670) the laser 110 by, e.g., opening the Q switch 250, and ends (675) the laser firing by, e.g., closing the Q switch 250. Finally, to complete the iteration, the method 600 tests (680) whether the current link is the last one. If so, the method 600 is complete. If not, the method 600 repeats the iterative loop for the next link by returning to the obtaining step 610. Although the motion of the laser beam spot 135 relative to the workpiece 130 could be in discrete steps, it is preferably continuous throughout the method 600.

FIGS. 7A and 7B are plots of laser beam spot position and laser charge as functions of time according to one embodiment. In FIG. 7A, the position of the laser beam spot 135 is plotted as a function of time, as the laser beam spot 135 moves along a bank of links. The dotted line is a straight line representing the ideal stage velocity, and the solid line represents measured stage velocity. Measured stage velocity has minor deviations from the ideal stage velocity. The "X" marks along the line represent the estimated position for firing the laser on the links. The diamond marks represent the actual firings. The circle marks represent the time/position at which the laser pre-pulse commands are issued an estimated time or distance before each firing position. The time difference between each diamond mark and its preceding circle mark is approximately the desired inter-pulse period. The velocity errors and hence timing difference are over-exaggerated on these figures to better illustrate the difference between estimated and actual laser firing time.

FIG. 7B shows an approximate representation of the energy in the laser cavity 225 on an identical time scale for an embodiment utilizing a Q-switch laser, such as the laser 110. As can be seen, when the laser 110 is fired and the Q switch 250 is closed (at the circle marks) the laser energy in the cavity 225 builds up until the Q switch 250 is opened (at the diamond marks). Laser cavity energy storage is lower before pre-pulse (circle) events and actual trigger (diamond) events. Careful observation shows that when a pulse occurs early (diamond precedes X) the laser pulse may have slightly less energy and the subsequent pre-pulse may have slightly more energy. One again, though, the timing differences between estimated and actual firing time on FIGS. 7A and 7B are over-exaggerated, resulting in over-exaggerated representations of laser cavity energy.

Other embodiments could employ alternative laser technologies. For example the laser could be a pulsed fiber laser configured in a master oscillator power amplifier configuration. In that embodiment, rather than relying on a Q-switch to gate the discharge of the laser, the semiconductor laser employed as the master oscillator to pump the gain fiber in the master oscillator power amplifier configuration can be controlled in such a fashion as to create the pre-pulse and the actual pulse at the appropriate times. In other alternate embodiments, wavelength-shifted lasers including green lasers or UV lasers, may be employed.

The methods and systems illustrated and described herein can exist in a variety of forms both active and inactive. For example, they can exist as one or more software programs comprised of program instructions in source code, object code, executable code or other formats. Any of the above can be embodied on a computer-readable medium, which include storage devices and signals, in compressed or uncompressed form. Exemplary computer-readable storage devices include conventional computer system RAM (random access memory), ROM (read only memory), EPROM (erasable, programmable ROM), EEPROM (electrically erasable, programmable ROM), flash memory and magnetic or optical disks or tapes. Exemplary computer-readable signals, whether modulated using a carrier or not, are signals that a computer system hosting or running a computer program can be configured to access, including signals downloaded through the Internet or other networks. Concrete examples of the foregoing include distribution of software on a CD ROM or via Internet download. In a sense, the Internet itself, as an abstract entity, is a computer-readable medium. The same is true of computer networks in general.

The terms and descriptions used herein are set forth by way of illustration only and are not meant as limitations. Those skilled in the art will recognize that many variations can be made to the details of the above-described embodiments without departing from the underlying principles of the invention. For example, certain steps of the method 600 may be performed in an order other than shown or simultaneously. The scope of the invention should therefore be determined only by the following claims (and their equivalents) in which all terms are to be understood in their broadest reasonable sense unless otherwise indicated.

The invention claimed is:

1. A method for operating a laser characterized by a PRF parameter that specifies a PRF at which pulses produced by the laser have desirable pulse properties for irradiating a target that is one of a set of structures on or within a workpiece, the laser emitting a laser pulse that propagates along a laser beam propagation path terminating at a laser beam spot on the workpiece, the method being effective to operate the laser at an effective PRF lower than the PRF parameter without substantially degrading the desirable pulse properties, the method comprising:
   receiving data indicating the location on the workpiece of the target to be selectively irradiated with the laser pulse;
   determining a firing position of the laser beam spot relative to the workpiece at which the laser should emit a pulse directed at the target;
   calculating, based on a desired charging time, a charging start position of the laser beam spot relative to the workpiece at which the laser should begin charging so as to charge for the desired charging time before the laser beam spot reaches the firing position, wherein the charging start position is not a location of a structure on the workpiece;

moving the workpiece and the laser beam spot relative to one another such that the laser beam spot moves over the charging start position and then to the firing position;

sensing a position of the laser beam spot relative to the workpiece as the workpiece moves relative to the laser beam spot;

commencing charging of the laser when the laser beam spot is at the charging start position, whereby the laser charges for approximately the desired charging time; and firing the laser when the laser beam spot reaches the firing position, whereby the laser emits a pulse having desired pulse properties.

2. The method of claim 1, further comprising:
pumping the laser continuously at a constant power.

3. The method of claim 1, further comprising:
repeating the determining, calculating, moving, sensing, commencing, and firing steps for each structure in the set of structures.

4. The method of claim 1, wherein the commencing step comprises:
pre-pulsing the laser to thereby release charged laser energy in a pre-pulse and the pre-pulse when the laser beam spot is at the charging start position; and
preventing the pre-pulse from reaching the workpiece.

5. The method of claim 1, wherein the laser comprises a Q switch, the commencing step comprises closing the Q switch, and the firing step comprises opening the Q switch.

6. The method of claim 1, further comprising:
preventing the pulse from reaching the workpiece.

7. The method of claim 1, further comprising:
allowing the pulse to reach the workpiece.

8. The method of claim 1, wherein the desired charging time is a function of the PRF parameter.

9. A method for operating a machine having a laser characterized by a PRF parameter that specifies a PRF at which pulses produced by the laser have desirable pulse properties for irradiating structures on or within a workpiece for a given purpose, the structures being arranged in on the workpiece a linear pattern having an approximately equal pitch between adjacent structures, the laser emitting a laser pulse that propagates along a laser beam propagation path terminating at a laser beam spot on the workpiece, the machine being capable of moving the workpiece and the laser beam spot relative to one another at a maximum speed that is less than the product of the PRF parameter and the pitch, the method being effective to move the laser beam spot across the structures along the linear pattern to selectively irradiate selected ones of the structures with the laser without substantially degrading the desirable pulse properties, the method comprising:

receiving data indicating the locations on the workpiece of the structures;

moving the workpiece and the laser beam spot relative to one another such that the laser beam spot moves along the linear pattern across the structures at a motion speed less than the product of the PRF parameter and the pitch;

commencing charging of the laser approximately a desired charging time before the laser beam spot is expected to reach each structure location, wherein the desired charging time is less than the quotient of the pitch divided by the motion speed;

firing the laser when the laser beam spot reaches each structure location, whereby the laser emits a pulse having desired pulse properties; and selectively blocking the laser beam propagation path depending upon whether the structure to which the laser beam is directed has been selected for irradiation.

10. A method according to claim 9, wherein the laser has a Q switch, commencing charging of the laser comprises closing the Q switch, and firing the laser comprises opening the Q switch.

11. The method of claim 9, further comprising:
monitoring the position of the laser beam spot relative to the workpiece as the laser beam spot;

determining charging start positions at which the laser beam spot will be located at the desired charging time before the laser beam spot is expected to reach each structure location; and performing the firing step when the position of the laser beam spot relative to the workpiece as the laser beam spot matches a charge start position.

12. The method of claim 9, further comprising:
calculating times at which to perform the commencing and firing steps; and performing the commencing and firing steps at times calculated by the calculating step.

13. The method of claim 9, wherein commencing charging comprise:
pre-pulsing the laser to emit a pre-pulse so that the pre-pulse ends as the commencing step begins; and
blocking the pre-pulse from reaching the workpiece.

14. The method of claim 9, wherein the workpiece is a semiconductor substrate.

15. The method of claim 14, wherein the structures are electrically conductive links that are severed when irradiated with the laser pulse.

16. The method of claim 9, wherein the desired charging time is a function of the PRF parameter.

17. The method of claim 16, wherein the firing step is initiated in advance of the laser beam spot intersecting each structure location by an amount based on one or more delays associated with firing the laser.

18. A computer-readable medium for use with a system for operating a machine having a laser characterized by a PRF parameter that specifies a PRF at which pulses produced by the laser have desirable pulse properties for irradiating structures on or within a workpiece for a given purpose, the structures being arranged in on the workpiece a linear pattern having an approximately equal pitch between adjacent structures, the laser emitting a laser pulse that propagates along a laser beam propagation path terminating at a laser beam spot on the workpiece, the machine being capable of moving the workpiece and the laser beam spot relative to one another at a maximum speed that is less than the product of the PRF parameter and the pitch, the method being effective to move the laser beam spot across the structures along the linear pattern to selectively irradiate selected ones of the structures with the laser without substantially degrading the desirable pulse properties, the computer-readable medium causing the controller to perform a method comprising:

receiving data indicating the locations on the workpiece of the structures;

moving the workpiece and the laser beam spot relative to one another such that the laser beam spot moves along the linear pattern across the structures at a motion speed less than the product of the PRF parameter and the pitch;

commencing charging of the laser approximately a desired charging time before the laser beam spot is expected to reach each structure location, wherein the desired charging time is less than the quotient of the pitch divided by the motion speed;

firing the laser when the laser beam spot reaches each structure location, whereby the laser emits a pulse having desired pulse properties; and selectively blocking the laser beam propagation path depending upon whether the structure to which the laser beam is directed has been selected for irradiation.

* * * * *

UNITED STATES PATENT AND TRADEMARK OFFICE
CERTIFICATE OF CORRECTION

PATENT NO.        : 7,227,098 B2                                   Page 1 of 1
APPLICATION NO.   : 10/931461
DATED             : June 5, 2007
INVENTOR(S)       : Kelly Bruland et al.

It is certified that error appears in the above-identified patent and that said Letters Patent is hereby corrected as shown below:

Please replace Drawing Fig. 7A with the following amended Drawing Fig. 7A.

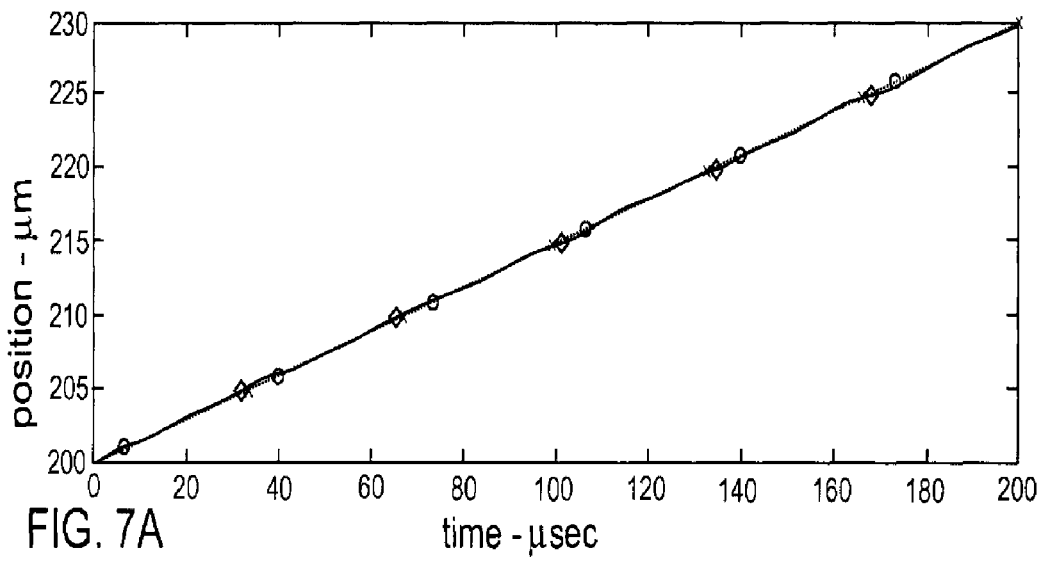

Signed and Sealed this

Eighth Day of September, 2009

David J. Kappos
*Director of the United States Patent and Trademark Office*